United States Patent
Turton et al.

(10) Patent No.: US 12,441,928 B1
(45) Date of Patent: Oct. 14, 2025

(54) METHOD AND COMPOSITION FOR TREATING LOST CIRCULATION

(71) Applicant: Halliburton Energy Services, Inc., Houston, TX (US)

(72) Inventors: Simon David Turton, Houston, TX (US); William Cecil Pearl, Houston, TX (US); Paul J Jones, Houston, TX (US); Ronnie Glen Morgan, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/737,708

(22) Filed: Jun. 7, 2024

(51) Int. Cl.
E21B 21/00 (2006.01)
C09K 8/487 (2006.01)

(52) U.S. Cl.
CPC ............ C09K 8/487 (2013.01); E21B 21/003 (2013.01)

(58) Field of Classification Search
None
See application file for complete search history.

(56) References Cited

U.S. PATENT DOCUMENTS

| | | | | |
|---|---|---|---|---|
| 4,445,576 A | * | 5/1984 | Drake | C09K 8/424 507/131 |
| 5,134,118 A | * | 7/1992 | Patel | C09K 8/24 507/119 |
| 5,762,416 A | * | 6/1998 | LeSire | B01F 25/31243 366/136 |
| 7,384,893 B2 | | 6/2008 | Morgan et al. | |
| 7,838,469 B2 | | 11/2010 | Cunningham et al. | |
| 2014/0051620 A1 | * | 2/2014 | Soane | C09K 8/36 252/60 |
| 2015/0166870 A1 | * | 6/2015 | Jain | C09K 8/516 166/305.1 |
| 2021/0087459 A1 | * | 3/2021 | Patil | E21B 43/13 |

FOREIGN PATENT DOCUMENTS

WO 2017052515 A1 3/2017

* cited by examiner

*Primary Examiner* — Andrew Sue-Ako
(74) *Attorney, Agent, or Firm* — McAfee & Taft

(57) ABSTRACT

An invert emulsion is used to form a hydrated flocculated polymer useful in reducing fluid loss in downhole operations. The invert emulsion can be sheared to form the hydrated flocculated polymer, which can be introduced downhole into the fluid loss flow path in a subterranean formation and allowed to accumulate at the pore throat to reduce fluid loss.

17 Claims, 4 Drawing Sheets

METHOD AND COMPOSITION FOR TREATING LOST CIRCULATION

FIELD

The present disclosure relates to the field of producing crude oil or natural gas from a well. More particularly, the inventions are directed to improved well fluids and methods for use in wells.

BACKGROUND

In drilling and completion operations in the oilfield, treatment fluids, such as drilling fluid or mud, are sometimes lost to the surrounding formation through natural fractures, cracks, fissures, or vugs, or through fractures and the like created during treatments or through fractures and the like created by prior treatments. Accordingly, fluid returns uphole are less than the amount of fluid pumped into the well. The magnitude of losses ranges from seepage to partial to severe to total and the impact on the well can range from a loss of a few barrels of fluid to a loss in the hydrostatic pressure with the potential for formation fluid influx into the well.

Substances called loss control agents or lost-circulation control agents are added to fluids, such as drilling fluids and the like when they are being lost to the formation downhole. Commonly used lost-circulation materials include fibrous (cedar bark, shredded cane stalks, mineral fiber, and hair), flaky (mica flakes and pieces of plastic or cellophane sheeting), or granular (ground and sized limestone or marble, wood, nut hulls, composite materials (such as FORMICA™ laminate), corncobs and cotton hulls).

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
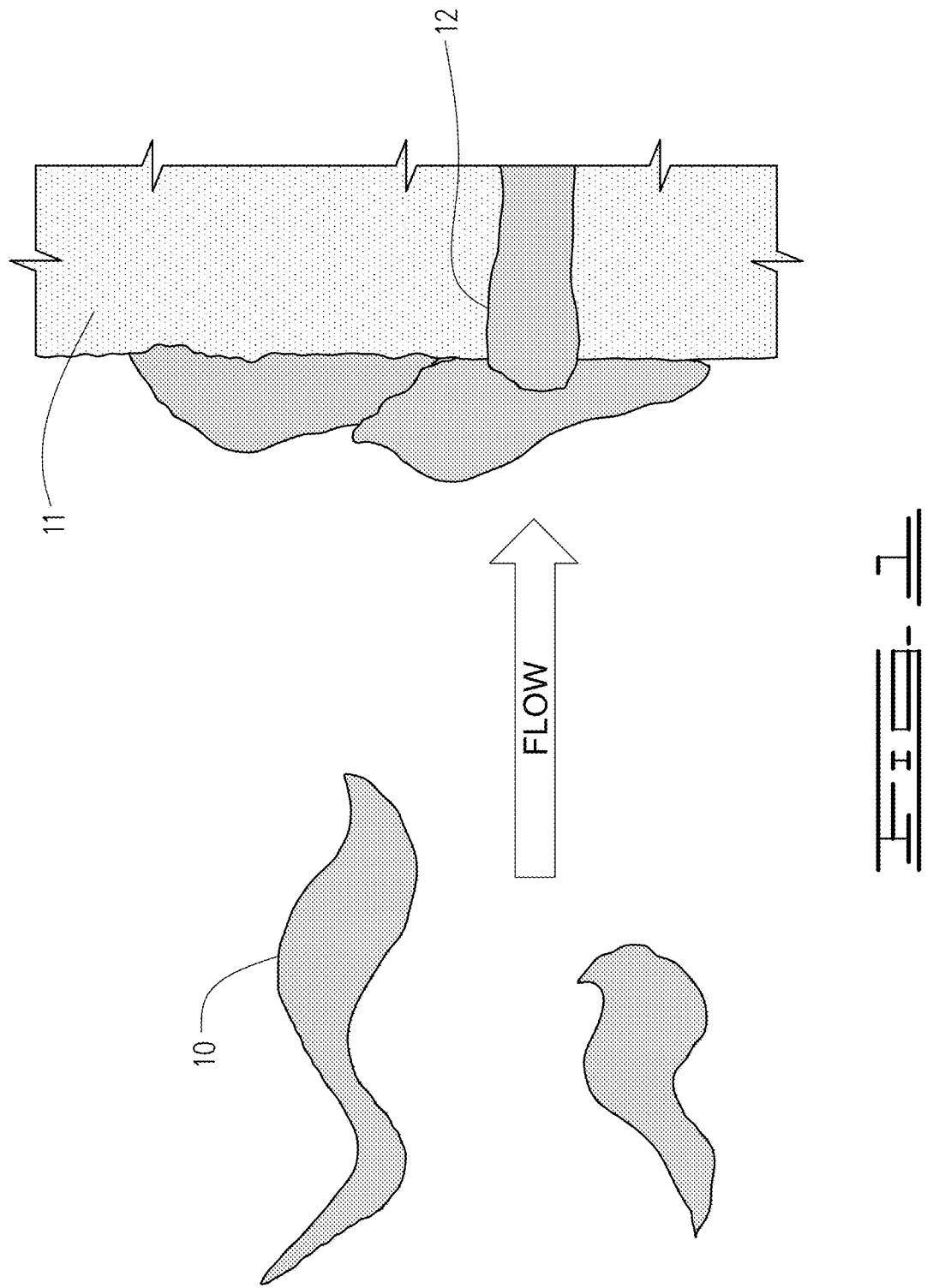
FIG. 1 is a schematic illustration of hydrated flocculated polymer in a loss zone associated with a subterranean formation.

The present disclosure may be understood more readily by reference to this detailed description, including the figures. For simplicity and clarity of illustration, where appropriate, reference numerals may be repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may have been exaggerated to better illustrate details and features of the present disclosure.

In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "upstream" meaning toward the surface of the wellbore and with "down," "lower," "downward," or "downstream" meaning toward the terminal end of the well, regardless of the wellbore orientation.

This disclosure will be described in terms of the treatment of vertical wells but is equally applicable to wells of any orientation. This disclosure will be described for hydrocarbon production wells, but it is to be understood that this disclosure may be used for wells for the production of other fluids, such as water or carbon dioxide, or, for example, for injection or storage wells, including injection of thermal fluids as a means of a geothermal storage system. It should also be understood that throughout this specification, when a concentration or amount, or other parameter range is described as being useful, or suitable, or the like, it is intended that any and every concentration or amount or other parameters within the range, including the endpoints, is to be considered as having been stated. Furthermore, each numerical value should be read once as modified by the term "about" (unless already expressly so modified) and then read again as not to be so modified unless otherwise stated in the context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Although much of the following discussion emphasizes alleviation of lost circulation in drilling, the compositions and methods of this disclosure may also be used in fluid loss control in other oilfield operations such as completion, cementing, remediation, injection of thermal storage fluids, and stimulation. The compositions and methods of this disclosure may also be used to plug hydraulic fractures growing into regions in which they are not desired. The composition and methods of this disclosure may also be used to plug hydraulic fractures in water-bearing zones or to plug fractures in zones of water intrusion.

Definitions: As used herein the following terms have the indicated meaning.

A well can include, without limitation, an oil, gas, or water production well, or an injection well. As used herein, a "well" includes at least one wellbore. A wellbore can include vertical, inclined, and horizontal sections, and it can be straight, curved, or branched. As used herein, a "well" also includes the near-wellbore region.

A near-wellbore region is the subterranean material and rock of the subterranean formation surrounding the wellbore. The near-wellbore region is generally considered to be the region within approximately 100 feet radially of the wellbore.

As used herein, "into a well" means and includes into any section of the well, including into the wellbore or into the near-wellbore region via the wellbore.

As used herein, the term "wellbore" includes any cased, and any uncased, open-hole section of the wellbore. A portion of a wellbore may be an open hole or cased hole. In an open-hole wellbore section, a tubing string may be placed into the wellbore. The tubing string allows fluids to be introduced into or flowed from a remote section of the reservoir. In a cased-hole wellbore section, a casing is placed into the wellbore that can also contain a tubing string. A wellbore can contain an annulus. Examples of an annulus include but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

"Down-hole operations" or "subterranean operations" means any operation that requires the performance of some action or procedure below the surface of the earth, including, but not limited to, actions or procedures performed in the course of recovering oil, gas, and/or other substances from a formation below the surface of the earth. Generally, these are drilling, completion, and workover operations, and thus, include operations related to the drilling of the wellbore, operations for making the well ready for production after drilling operations, and operations to repair or stimulate an existing production well for the purpose of restoring, prolonging or enhancing the production of hydrocarbons.

A "treatment fluid" is a fluid used in down-hole operations. Often these will comprise an oil or aqueous base fluid and can include gelling agents, viscosifiers, and other additives that support the downhole operation. A treatment fluid may be used in a variety of subterranean operations. As used herein, the term "treatment," or "treating," does not imply any particular action by the fluid or any particular component thereof, but instead refers to any use related to a subterranean operation in conjunction with a desired function and/or for a desired purpose. For example, a fluid may be used to drill a wellbore in a subterranean formation or to complete a wellbore in a subterranean formation, as well as numerous other purposes.

"Wellbore fluids" broadly refers to fluids in the wellbore and includes treatment fluids, and hydrocarbons or aqueous fluids produced from subterranean formations.

"Fluid loss" refers to the undesirable leakage of the liquid phase of a treatment fluid, which may contain solid particles, into the matrix of a subterranean formation surrounding a portion of the wellbore.

"Filter cake" as used herein refers to the buildup of solid materials, which for this disclosure may be solid particulates material, loss circulation materials, and/or hydrated flocculated polymer gel or globules) on the walls of the wellbore. Depending on the solid material and the liquid phase, such a filter cake may help block the further loss of the liquid phase (sometimes referred to as a filtrate) into the subterranean formation. Providing effective fluid-loss control for well fluids is usually highly desirable.

"Solid particulates" refers to particles of solids having a d50 average particle size no greater than 250 microns, and alternatively from 1 micron to 250 microns. For example, the solid particulates can be selected from the group consisting of pumice, perlite, cement, recycled glass, fly ash, cement kiln dust (CKD), silica flour, microsand, lime, magnesium oxide, metakaolin, calcium carbonate, and combinations thereof.

"Lost-circulation material" refers to solid material that is fibrous, flaky, or granular and has a d50 average particle size of greater than 250 microns. For example, the lost-circulation material can be selected from the group consisting of cedar bark, shredded cane stalks, mineral fiber, hair, mica flakes, pieces of plastic, pieces of cellophane sheeting, ground limestone, ground marble, wood, nut hulls, composite materials, corncobs, and cotton hulls.

The present disclosure utilizes a hydrated flocculated polymer produced from a hydratable polymer for reducing fluid loss in downhole operations. Generally, the hydratable polymer will be provided to the wellsite as an invert emulsion. An invert emulsion is one in which oil is the continuous or external phase and water is the internal phase. In the invert emulsion of this disclosure, the hydratable polymer is contained in the water phase or internal phase.

Prior to use as a loss control agent, the emulsion is sheared to release the hydratable polymer in a manner that causes the polymer to hydrate and flocculate. Flocculation is a process by which the hydratable polymer comes out of the emulsion in a manner that results in contact and adhesion of particles so that the hydrated polymer is agglomerated into globules. Accordingly, the hydrated flocculated polymer is in the form of a gel in globules, which are typically agglomerated into large masses formed of a plurality of gel globules.

After shearing, the hydrated flocculated polymer is introduced to the subsurface formation experiencing loss of treatment fluid to the formation. Typically, the shearing will be done at the surface and the hydrated flocculated polymer will be introduced into the wellbore to subsequently be provided to the subsurface formation. However, it is within the scope of this disclosure for the shearing to be accomplished downhole but prior to providing the polymer to the subsurface formation.

For example, the hydrated flocculated polymer can be introduced downhole as a pill, which includes the hydrated flocculated polymer and a treatment fluid. The treatment fluid can be either the same or different from the one being used in down-hole operations but will typically be an aqueous fluid. For example, the hydrated flocculated polymer can be present in an amount of around 1 lb/barrel of the treatment fluid, for example, the hydrated flocculated polymer can be present in an amount from 0.1 lb to 10 lbs per barrel of the treatment fluid, alternatively from 1 lb to 3 lb per barrel of the treatment fluid.

Further, the pill can include the loss of circulation material and/or solid particles. In any of the embodiments used herein, the pill can include a viscosifying agent such as, for example, biopolymer, guar, locust bean gum, guar derivative, clay, and combinations thereof. Biopolymers are polymers that are produced by or derived from living organisms, such as plants and microbes, rather than from petroleum. Applicable biopolymers include diutan, xanthan gum, welan gum, scleroglucan, and chitosan. For example, the clay can be bentonite, hectorite, sepiolite, or attapulgite.

As indicated, the pill will typically be formed from at least the hydrated flocculated polymer and an aqueous fluid, which can be water. Generally, the ratio of hydrated flocculated polymer to water in the aqueous fluid will be 1:800, or more typically 1:400 parts by mass. If used, the lost circulation material will generally be present in an amount from 1 to 30 lb/bbl of the aqueous fluid, and solid particulates will generally be used in a concentration of 1 to 30 lb/bbl of the aqueous fluid for fluid loss control purpose or can be used from 10 to 500 lb/bbl of the aqueous fluid for densification, that is as weighting agents.

Once at the subsurface formation, the hydrated flocculated polymer will progress to the openings (hereinafter "pore throats") through which treatment fluid is lost. Thus, the hydrated flocculated polymer is allowed to accumulate at the pore throat to reduce fluid loss.

Figure 2:
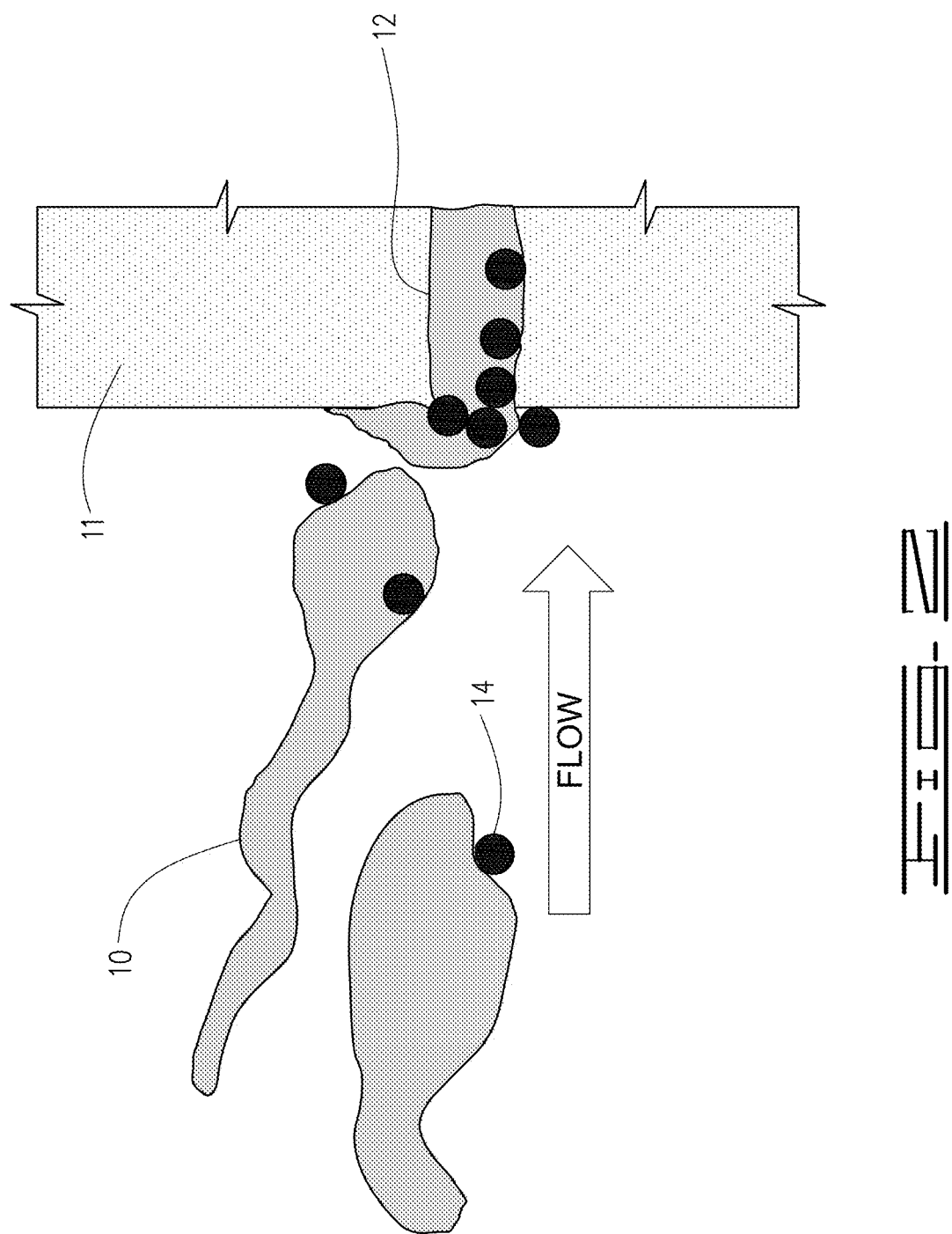
FIG. 2 is a schematic illustration of hydrated flocculated polymer with solid particulates in a loss zone associated with a subterranean formation.
Figure 3:
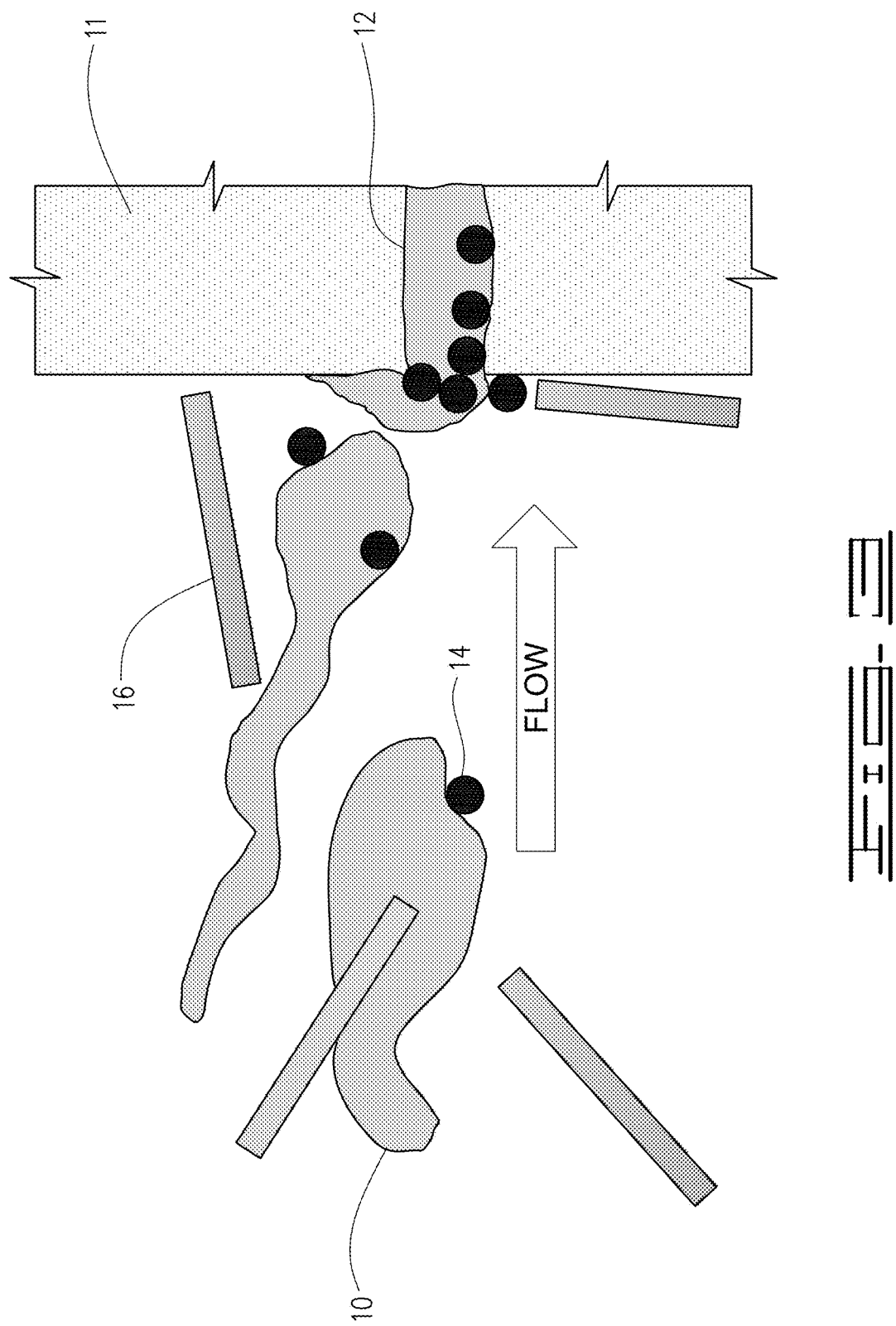
FIG. 3 is a schematic illustration of hydrated flocculated polymer with solid particulates and lost-circulation material in a loss zone associated with a subterranean formation.

Turning now to FIG. 1, the action of the hydrated flocculated polymer downhole can be seen. Hydrated flocculated polymers 10, after introduction downhole move towards "pore throats 12 of the fractures, cracks, fissures, or vugs in the formation surrounding 11 the borehole. These are the pore throats through which treatment fluid is lost to the surrounding formation. As can be seen in FIG. 1, the hydrated flocculated polymers 10 accumulate in and around the pore throats 12 to form a filter cake; that is, to seal the pore throat at least partially from the entry of the liquid phase of a treatment fluid and thereby reduce loss of treatment fluid through the pore throats. Additionally, as illustrated in FIGS. 2 and 3, the hydrated flocculated polymers 10 can be added with solid particulates 14 and/or lost-circulation material 16. As such, the hydrated flocculated polymer 10 can serve similarly to mortar to anchor the solid particulates 14 and/or lost-circulation material 16 at the pore throat, and thus, enhance the filter cake to further reduce loss of treatment fluid through the pore throat.

As can be appreciated by the above, the use of an invert emulsion to generate globules of hydrated polymer (hydrated flocculated polymers) enhances the fluid-loss control than the use of polymer in a dispersed form. Moreover, the use of such globules avoids the necessity to cross-polymerize the polymer. The fluid-loss control agents disclosed herein specifically using hydrated flocculated polymers are additives specifically designed to lower the volume of a filtrate that passes through a filter medium.

In any of the embodiments, the hydratable polymer can be a polymer or copolymer but will typically be non-cross-linked. For example, the hydrated polymer can be polymer or copolymer produced from the group consisting of N,N-dimethylacrylamide ("NNDMA"), 2-acrylamido-2-methylpropanesulfonic acid ("ATBS"), 2-acrylamido-2-methylpropanesulfonate salts having counter ions such as sodium, calcium, magnesium, and ammonium ions, sodium 2-acrylamido-2-methylpropanesulfonate, N-(hydroxymethyl)acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and any derivative thereof, and mixtures thereof. For example, copolymers may include NNDMA/ATBS copolymer. When an NNDMA/ATBS copolymer is employed, the ratio of NNDMA to ATBS mole ratio may range from about 1:5 to about 5:1, or alternatively from about 1:4 to about 4:1, or alternatively from about 1:3 to about 3:1, or alternatively from about 1:2 to about 2:1.

The weight average molecular weight (daltons) of the hydratable polymer may be at least 600,000, or alternatively at least 700,000, or alternatively at least 800,000, or alternatively at least 900,000, or alternatively at least 1 million (M), or alternatively at least 1.1M, or alternatively at least 1.2M or alternatively in a range of from 600,000 to 4M, or alternatively from 700,000 to 2.5M, or alternatively of from 1M to 1.5M.

Figure 4:
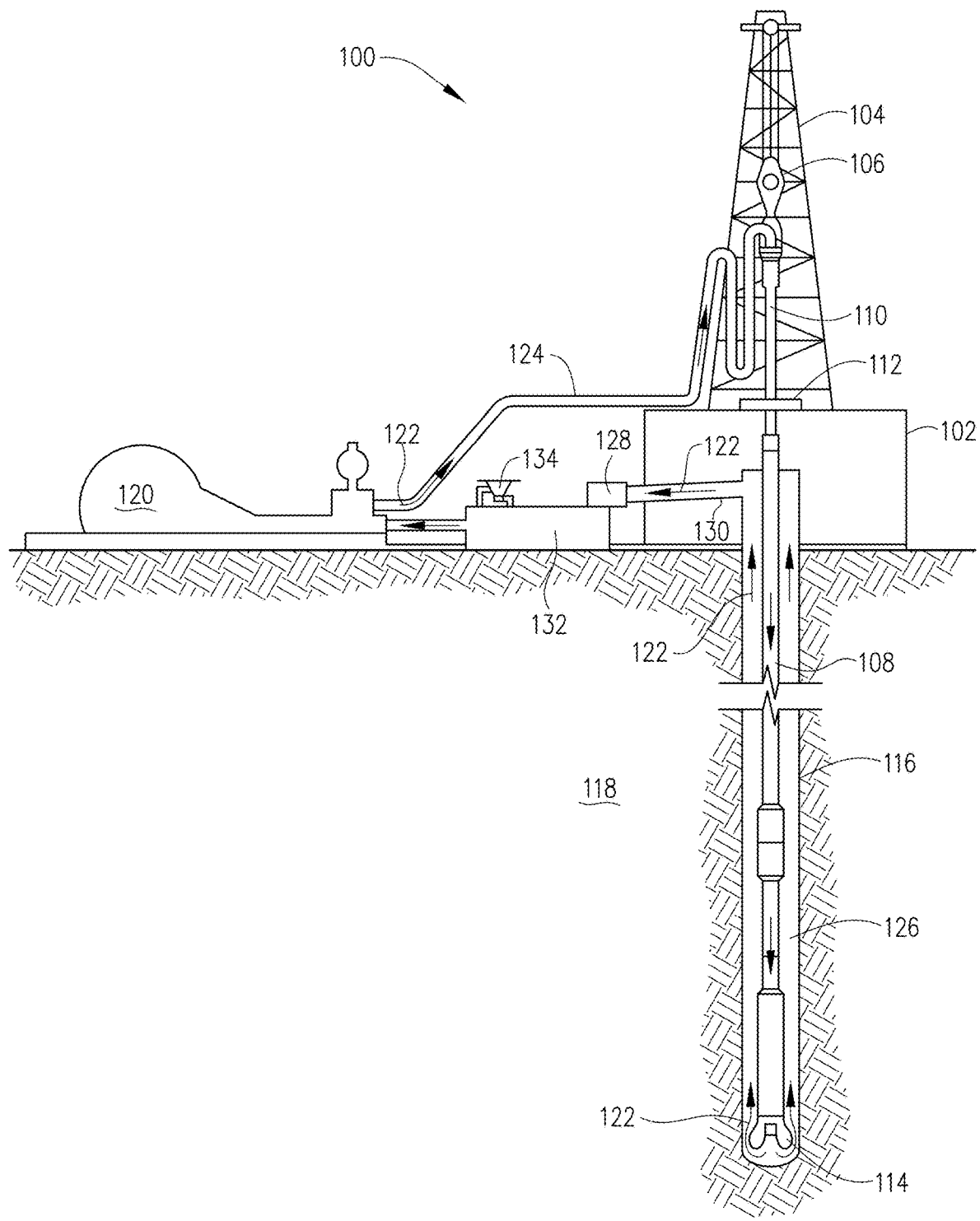
FIG. 4 is a schematic illustration of a drilling assembly that might utilize the loss control agents and associated processes disclosed herein.

The exemplary loss control agents disclosed herein may directly or indirectly affect one or more components or pieces of equipment associated with the preparation, delivery, recapture, recycling, reuse, and/or disposal of the disclosed loss control agents. For example, and with reference to FIG. 4, the disclosed agents may directly or indirectly affect one or more components or pieces of equipment associated with an exemplary wellbore drilling assembly 100, according to any of the embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed agents may be added to the drilling fluid 122 via a mixing hopper 134, or other suitable devices, communicably coupled to or otherwise in fluid communication with the retention pit 132. The mixing hopper 134 may include but is not limited to, mixers and related mixing equipment known to those skilled in the art. The invert emulsion loss control agents of this disclosure can, for example, undergo shearing in the hopper or the mud pit, such as by use of a mixer where the mixer blades are instrumental in shearing the hydrated polymer. Alternatively, a static turbulizer can be used for mixing and shearing with or without the use of a mud pit.

In any of the embodiments, however, the disclosed agents may be added to the drilling fluid 122 at any other location in the drilling assembly 100; however, typically the invert emulsion loss control agent will be sheared to break the emulsion prior to the drilling fluid being introduced downhole. In at least one embodiment, for example, there could be more than one retention pit 132, such as multiple retention pits 132 in series. Moreover, the retention pit 132 may be representative of one or more fluid storage facilities and/or units where the disclosed agents may be stored, reconditioned, and/or regulated until added to the drilling fluid 122.

As mentioned above, the disclosed loss control agents may directly or indirectly affect the components and equipment of the drilling assembly 100. For example, the disclosed agents may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or similar. The fluid processing unit(s) 128 may further include one or more sensors, gauges, pumps, compressors, and the like used to store, monitor, regulate, and/or recondition the exemplary agents.

The disclosed loss control agents may directly or indirectly affect pump 120, which representatively includes any conduits, pipelines, trucks, tubulars, and/or pipes used to fluidically convey the agents downhole, any pumps, compressors, or motors (e.g., topside or downhole) used to drive the agents into motion, any valves or related joints used to regulate the pressure or flow rate of the agents, and any sensors (i.e., pressure, temperature, flow rate, etc.), gauges, and/or combinations thereof, and the like. The disclosed agents may also directly or indirectly affect the mixing hopper 134 and the retention pit 132 and their assorted variations.

The disclosed loss control agents may also directly or indirectly affect the various downhole equipment and tools that may come into contact with the loss control agents such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed agents may also directly or indirectly affect any downhole heat exchangers, valves, and corresponding actuation devices, tool seals, packers, and other wellbore isolation devices or components, and the like associated with the wellbore 116. The disclosed agents may also directly or indirectly affect the drill bit 114, which may include, but is not limited to, roller cone bits, PDC bits, natural diamond bits, any hole openers, reamers, coring bits, etc.

While not specifically illustrated herein, the disclosed loss control agents may also directly or indirectly affect any transport or delivery equipment used to convey the agents to the drilling assembly 100 such as for example, any transport vessels, conduits, pipelines, trucks, tubulars, and/or pipes used to fluidically move the agents from one location to another, any pumps, compressors, or motors used to drive the agents into motion, any valves or related joints used to regulate the pressure or flow rate of the agents, and any sensors (i.e., pressure and temperature), gauges, and/or combinations thereof, and the like.

The above method, its steps and systems incorporating the method can be better understood by the following examples, which support and illustrate the process.

Example

In the example below four lost circulation treatments comprising a spacer additive, water, and barite were prepared. Slurry numbers 1 and 4 did not include a hydrated flocculated polymer in accordance with this disclosure. Slurry numbers 2 and 3 contained a hydrated flocculated polymer in accordance with this disclosure. The hydrated flocculated polymer was the result of breaking an invert emulsion. The invert emulsion contained a non-crosslinked hydratable polymer and is marketed under the tradename HalAdvance 344 (invert emulsion) from Halliburton Energy Services, Inc., of Duncan, OK. Additionally, slurry numbers 3 and 4 contained a lost circulation material in the form of STEELSEAL 100 LCM from Halliburton Energy Services. Rheology and fluid loss through a 60-mesh screen with a 1000 psi pressure differential were measured for all four slurries. The results are shown in Table 1.

TABLE 1

| Job Type | | SLURRY NUMBER | | | |
|---|---|---|---|---|---|
| | | 4 Lost Circulation Treatment | 3 Lost Circulation Treatment | 2 Lost Circulation Treatment | 1 Lost Circulation Treatment |
| Density | lb/gal | 12 | 12 | 12 | 12 |
| Tuned Defense Spacer | lb/bbl | 20 | 20 | 20 | 20 |
| Field (Fresh) Water | gal/bbl | 34.59 | 33.63 | 34.15 | 35.1 |
| Barite | lb/bbl | 185.95 | 184.49 | 190.17 | 191.63 |
| Hydrated Flocculated Polymer | gal/bbl | 0 | 1 | 1 | 0 |
| STEELSEAL 100 (PB) | lb/bbl | 10 | 10 | 0 | 0 |
| TESTS | | | | | |
| API Rheology | 300 | 24.3 | 100.2 | 87.2 | 22.8 |
| | 200 | 19.1 | 79.35 | 68.45 | 18 |
| | 100 | 12.6 | 52.35 | 45.1 | 11.7 |
| | 60 | 9.75 | 38.5 | 33.5 | 8.6 |
| | 30 | 6.6 | 25.25 | 21.35 | 6.15 |
| | 6 | 3.6 | 9.9 | 8.6 | 3.6 |
| | 3 | 2.8 | 7.2 | 6.05 | 2.85 |
| | Cond. Time (min) | 30 | 30 | 30 | 30 |
| | Cond.Temp. (degF.) | 80 | 80 | 80 | 80 |
| | Foam Quality (%) | 0 | 0 | 0 | 0 |
| Screen flow-through test | Temp. (degF.) | 80 | 80 | 80 | 80 |
| | Screen Size (micron) | 250 | 250 | 250 | 250 |
| | Screen Type | 60 | 60 | 60 | 60 |
| | Delta Pressure (psi) | 1000 | 1000 | 1000 | 1000 |
| | Duration (HH:MM) | 00:30 | 00:30 | 00:30 | 00:30 |
| | Spurt Loss (mL/<30 s) | 24 | 25 | 28 | 24 |
| | Total Fluid Loss (mL/30 min) | 50 | 50 | 43 | 75 |

Slurry numbers 2 and 3 containing the hydrated flocculated polymer have lower total fluid loss compared to slurry 1 which has no hydrated flocculated polymer. Additionally, slurry 2, which contained the hydrated flocculated polymer and no LCM had lower total fluid loss compared to slurries 3 and 4, which contained LCM. All slurries exhibit an initial spurt loss that is roughly equivalent. The lower total fluid loss indicates the ability of the hydrated polymer flocculants from the invert emulsion to promote the treatment of lost circulation.

The above disclosure, and embodiments thereunder, are exemplified by methods and systems defined by the following numbered embodiments; however, the embodiments are not limited to the following numbered embodiments.

Embodiment 1: A method for reducing fluid loss in downhole operations, the method comprising:
    introducing a hydrated flocculated polymer downhole into the fluid loss flow path in a subterranean formation, wherein the hydrated flocculated polymer is produced from a hydratable polymer; and allowing the hydrated flocculated polymer to accumulate at the pore throat to reduce fluid loss, alternatively, the hydrated flocculated polymer is not crosslinked, and/or is used in the absence of a crosslinked polymer fluid-loss control agent.

Embodiment 2: The method of Embodiment 1, wherein the hydrated flocculated polymer is produced by:

providing invert emulsion of oil and water, with the water phase containing the hydratable polymer; and shearing the invert emulsion to produce the hydrated flocculated polymer.

Embodiment 3: The method of Embodiment 2, wherein the invert emulsion is sheared at the surface by a mixer or combination of mixing processes in series.

Embodiment 4: The method of any of Embodiments 1 to 3, wherein the hydrated flocculated polymer is introduced downhole as a pill, which includes the hydrated flocculated polymer and a treatment fluid.

Embodiment 5: The method of Embodiment 4, wherein the pill includes solid particulates having a d50 average particle size no greater than 250 microns, and alternatively from 1 micron to 250 microns.

Embodiment 6: The method of Embodiment 5, wherein the solid particulates are selected from the group consisting of pumice, perlite, cement, recycled glass, fly ash, cement kiln dust (CKD), silica flour, microsand, lime, magnesium oxide, metakaolin, calcium carbonate and combinations thereof.

Embodiment 7: The method of any of Embodiments 4 to 5, wherein the pill includes a lost-circulation material, which is fibrous, flaky, or granular and has a d50 average particle size of greater than 250 microns.

Embodiment 8: The method of Embodiment 7, wherein the lost-circulation material is selected from the group consisting of cedar bark, shredded cane stalks, mineral fiber, hair, mica flakes, pieces of plastic, pieces of cellophane sheeting, ground limestone, ground marble, wood, nut hulls, composite materials, corncobs, and cotton hulls.

Embodiment 9: The method of any of Embodiments 4 to 8, wherein the pill includes a viscosifying agent.

Embodiment 10: The method of Embodiment 9, wherein the viscosifying agent is selected from the group consisting of biopolymer, guar, locust bean gum, guar derivative, clay, and combinations thereof.

Embodiment 11: The method of any of Embodiments 1 to 10, wherein the hydratable polymer is a polymer or copolymer and is produced from the group consisting of N,N-dimethylacrylamide ("NNDMA"), 2-acrylamido-2-methylpropanesulfonic acid ("ATBS"), 2-acrylamido-2-methylpropanesulfonate salts having counter ions such as sodium, calcium, magnesium, and ammonium ions, sodium 2-acrylamido-2-methylpropanesulfonate, N-(hydroxymethyl)acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and any derivative thereof, and mixtures thereof.

Embodiment 12: The method of Embodiment 11, wherein the polymer is an NNDMA/ATBS copolymer.

Embodiment 13: The method of Embodiment 12, wherein the NNDMA/ATBS copolymer has a ratio of NNDMA to ATBS mole ratio in the range of from about 1:5 to about 5:1, or alternatively from about 1:4 to about 4:1, or alternatively from about 1:3 to about 3:1, or alternatively from about 1:2 to about 2:1.

Embodiment 14: The method of any of Embodiments 11 to 13, wherein the average molecular weight (daltons) of the polymerized polymer may be at least 600,000, or alternatively at least 700,000, or alternatively at least 800,000, or alternatively at least 900,000, or alternatively at least 1 million (M), or alternatively at least 1.1M, or alternatively at least 1.2M or alternatively in a range of from 600,000 to 4M, or alternatively from 700,000 to 2.5M, or alternatively of from 1M to 1.5M.

Embodiment 15: The method of any of Embodiments 1 to 14, wherein the hydrated flocculated polymer is introduced downhole with a treatment fluid.

Embodiment 16: The method of Embodiment 15, wherein the hydrated flocculated polymer is in well treatment fluid and is present in an amount of 1 lb/barrel of treatment fluid 0.1 lb to 10 lbs per barrel of treatment fluid, alternatively from 1 lb to 3 lb per barrel of treatment fluid.

Embodiment 17: A composition for reducing fluid loss in downhole operations, the composition comprising:

a hydrated flocculated polymer produced from a hydratable polymer; and a treatment fluid.

Embodiment 18: The composition of Embodiment 17, further comprising solid particulates having a d50 average particle size no greater than 250 microns, and alternatively from 1 micron to 250 microns.

Embodiment 19: The composition of Embodiment 18, wherein the solid particulates are selected from the group consisting of pumice, perlite, cement, recycled glass, fly ash, cement kiln dust (CKD), silica flour, microsand, lime, magnesium oxide, metakaolin, calcium carbonate and combinations thereof.

Embodiment 20: The composition of any of Embodiments 17 to 19, further comprising a lost-circulation material, which is fibrous, flaky or granular and has a d50 average particle size of greater than 250 microns.

Embodiment 21: The composition of Embodiment 20, wherein the lost-circulation material is selected from the group consisting of cedar bark, shredded cane stalks, mineral fiber, hair, mica flakes, pieces of plastic, pieces of cellophane sheeting, ground limestone, ground marble, wood, nut hulls, composite materials, corncobs, and cotton hulls.

Embodiment 22: The composition of any of Embodiments 17 to 21, wherein the pill includes a viscosifying agent.

Embodiment 23: The composition of Embodiment 22, wherein the viscosifying agent is selected from the group consisting of biopolymer, guar, locust bean gum, guar derivative, clay, and combinations thereof.

Embodiment 24: The composition of any of Embodiments 17 to 23, wherein the hydratable polymer is a polymer or copolymer and is produced from the group consisting of N,N-dimethylacrylamide ("NNDMA"), 2-acrylamido-2-methylpropanesulfonic acid ("ATBS"), 2-acrylamido-2-methylpropanesulfonate salts having counter ions such as sodium, calcium, magnesium, and ammonium ions, sodium 2-acrylamido-2-methylpropanesulfonate, N-(hydroxymethyl)acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and any derivative thereof, and mixtures thereof.

Embodiment 25: The composition of Embodiment 24, wherein the polymer is an NNDMA/ATBS copolymer.

Embodiment 26: The composition of Embodiment 25, wherein the NNDMA/ATBS copolymer has a ratio of NNDMA to ATBS mole ratio in the range of from about 1:5 to about 5:1, or alternatively from about 1:4 to about 4:1, or alternatively from about 1:3 to about 3:1, or alternatively from about 1:2 to about 2:1.

Embodiment 27: The composition of any of Embodiments 24 to 26, wherein the average molecular weight (daltons) of the polymerized polymer may be at least 600,000, or alternatively at least 700,000, or alternatively at least 800,000, or alternatively at least 900,000, or alternatively at least 1 million (M), or alternatively at least 1.1M, or alternatively at least 1.2M or alternatively in a range of from 600,000 to 4M, or alternatively from 700,000 to 2.5M, or alternatively of from 1M to 1.5M.

Embodiment 28: The composition of any of Embodiments 17 to 27, wherein the hydrated flocculated polymer is present in an amount of 1 lb/barrel in well treatment fluid 0.1 lb to 10 lbs per barrel of well treatment fluid, alternatively from 1 lb to 3 lb per barrel of treatment fluid.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to be the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method for reducing fluid loss in downhole operations, the method comprising:
    introducing a hydrated flocculated polymer downhole into a fluid loss flow path in a subterranean formation, wherein the hydrated flocculated polymer is produced from a hydratable polymer, wherein the hydrated flocculated polymer is produced by:
        providing an invert emulsion of an oil phase and a water phase, with the water phase containing the hydratable polymer; and
        shearing the invert emulsion so as to produce the hydrated flocculated polymer; and
    allowing the hydrated flocculated polymer to accumulate at a pore throat to reduce fluid loss.
2. The method of claim 1, wherein the hydratable polymer is a polymer or copolymer and is produced from one or more monomers selected from the group consisting of N,N-dimethylacrylamide ("NNDMA"), 2-acrylamido-2-methylpropanesulfonic acid ("ATBS"), 2-acrylamido-2-methylpropanesulfonate salts having counter ions comprising sodium, calcium, magnesium, or ammonium ions, sodium 2-acrylamido-2-methylpropanesulfonate, N-(hydroxymethyl)acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, sodium 4-styrenesulfonate, vinylsulfonic acid, and any derivative thereof, and mixtures thereof.
3. The method of claim 2, wherein the polymer is an NNDMA/ATBS copolymer.
4. The method of claim 2, wherein the hydrated flocculated polymer is introduced downhole as a pill, which includes the hydrated flocculated polymer and a treatment fluid.
5. The method of claim 4, wherein the pill includes solid particulates having a d50 average particle size from 1 micron to 250 microns.
6. The method of claim 5, wherein the solid particulates are selected from the group consisting of pumice, perlite, cement, recycled glass, fly ash, cement kiln dust (CKD), silica flour, microsand, lime, magnesium oxide, metakaolin, calcium carbonate and combinations thereof.
7. The method of claim 6, wherein the pill includes a lost-circulation material, which is fibrous, flaky, or granular.
8. The method of claim 7, wherein the lost-circulation material is selected from the group consisting of cedar bark, shredded cane stalks, mineral fiber, hair, mica flakes, pieces of plastic, pieces of cellophane sheeting, ground limestone, ground marble, wood, nut hulls, composite materials, corncobs, and cotton hulls.
9. The method of claim 8, wherein the pill includes a viscosifying agent.
10. The method of claim 9, wherein the viscosifying agent is selected from the group consisting of biopolymer, guar, locust bean gum, guar derivative, clay, and combinations thereof.
11. The method of claim 1, wherein the hydrated flocculated polymer is introduced downhole as a pill, which includes the hydrated flocculated polymer and a treatment fluid.
12. The method of claim 11, wherein the pill includes solid particulates having a d50 average particle size from 1 micron to 250 microns.
13. The method of claim 12, wherein the solid particulates are selected from the group consisting of pumice, perlite, cement, recycled glass, fly ash, cement kiln dust (CKD), silica flour, microsand, lime, magnesium oxide, metakaolin, calcium carbonate and combinations thereof.
14. The method of claim 13, wherein the pill includes a lost-circulation material, which is fibrous, flaky, or granular.
15. The method of claim 14, wherein the lost-circulation material is selected from the group consisting of cedar bark, shredded cane stalks, mineral fiber, hair, mica flakes, pieces of plastic, pieces of cellophane sheeting, ground limestone, ground marble, wood, nut hulls, composite materials, corncobs, and cotton hulls.
16. The method of claim 15, wherein the pill includes a viscosifying agent.
17. The method of claim 16, wherein the viscosifying agent is selected from the group consisting of biopolymer, guar, locust bean gum, guar derivative, clay, and combinations thereof.

* * * * *